Aug. 21, 1928.
D. MARINSKY
COUPLING MEMBER FOR ATTACHING DEVICES
Original Filed Nov. 17, 1925
1,681,549
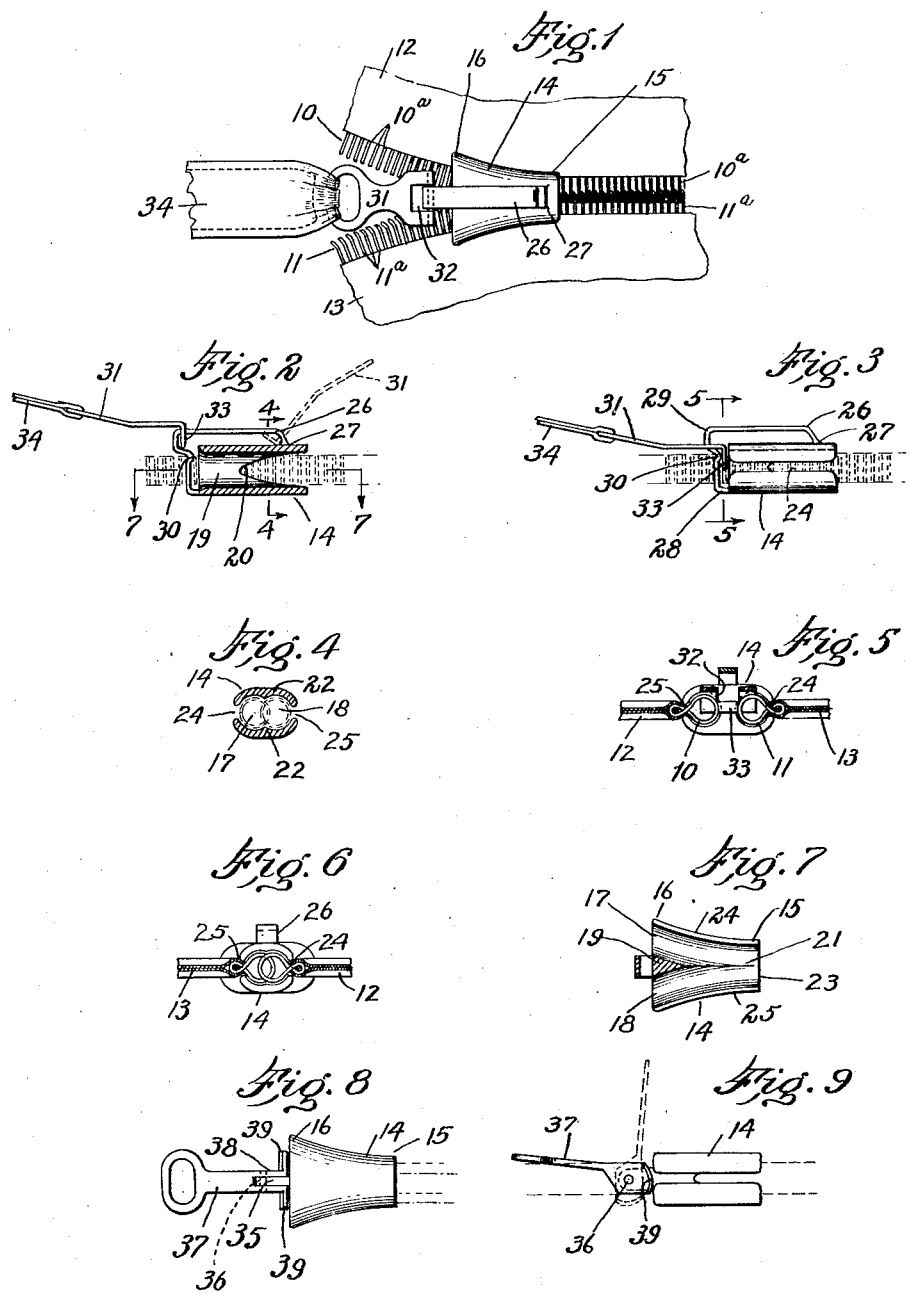
INVENTOR
Davis Marinsky
BY
ATTORNEY Patented Aug. 21, 1928.

1,681,549

UNITED STATES PATENT OFFICE.

DAVIS MARINSKY, OF BRONX, NEW YORK.

COUPLING MEMBER FOR ATTACHING DEVICES.

Application filed November 17, 1925, Serial No. 69,582. Renewed January 14, 1928.

This invention relates to attaching devices and particularly to the member slidably engaging such devices for coupling and uncoupling the same, such for example as attaching devices as shown and described in a prior patent granted to me October 13, 1925, numbered 1,557,304; and the object of my invention is to provide a coupling member of the class and for the purpose specified which is so constructed as to facilitate the coupling and uncoupling of attaching devices in a quick, accurate and easy manner and especially in the coupling and uncoupling of attaching devices, the interlocking members of which are substantially circular in form; a further object being to provide a device of the class specified with means for locking the same in connection with the coupling members in different positions of adjustment to prevent the operation of the slide or lock member and also to prevent the accidental separation of the separate parts of the attaching device; a still further object being to provide locking means for a device of the class specified, which also serves as a handle member to facilitate the operation of the device in coupling and uncoupling the attaching device; and with these and other objects in view, the invention consists in a device of the class and for the purpose specified, which is simple in construction and operation, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of an attaching device showing one of my improved coupling members mounted in connection therewith, and indicating the method of its use.

Fig. 2 is a side and sectional view of the construction as shown in Fig. 1 with parts of the attaching device indicated in dotted lines.

Fig. 3 is a side view of the device shown in Fig. 1 with the lock and operating member in a different position.

Fig. 4 is a partial section on the line 4—4 of Fig. 2.

Fig. 5 is a section on the line 5—5 of Fig. 3.

Fig. 6 is an end view.

Fig. 7 is a section on the line 7—7 of Fig. 2.

Fig. 8 is a view similar to Fig. 1 but showing a modified form of device, detached; and, Fig. 9 is a side view of the device shown in Fig. 8 with one part thereof shown in full and dotted lines.

My invention relates to coupling devices for coupling and uncoupling attaching devices such as shown in the patent hereinbefore referred to. In Fig. 1 of the drawing, I have shown, for illustrative purposes, the separate parts or stringers 10 and 11 of an attaching device, secured to suitable supports 12 and 13 respectively. In said figure, 14 represents one of my improved coupling devices or slides for use in coupling and uncoupling the parts 10 and 11.

In the construction shown, the device 14 when viewed in plan, is provided with a narrow end portion 15 and a flared or wider end portion 16 forming a substantially V-shaped body provided with two channels 17 and 18 opening through the opposite ends of the device, the opening through the larger end 16 being separated by a partition wall 19 of the cross sectional form seen in Fig. 7 and of the general form represented clearly in Fig. 2 of the drawing. This wall converges toward the narrow or contracted end 15 of the device 14, and the central part of the wall is cut out at the point 20, while the upper and lower faces continue to points 21 in rib members 22, note Fig. 4, substantially V-shaped in cross section. The channels 17 and 18 join at the small or contracted end 15 of the device into one large opening 23, and both of the channels 17 and 18 open outwardly and through the opposite sides of the device as seen at 24 and 25, the apertures 24 and 25 permitting of the passage of the supports 12 and 13 of the attaching devices 10 and 11 through the coupling member or device 14, as will be apparent, and as seen in Figs. 5 and 6 of the drawing.

In the accompanying drawing, the device 14 is shown of unitary construction, and it will be understood that this device may be constructed in any desired manner; the distinctive features of the device being the cross sectional form of the channels 17 and 18 as well as the specific form of the partition wall 19 and the rib extensions 22 thereof which are adapted to lie in the substantially V-shaped crevice formed between the circular attaching devices 10 and 11 when coupled together, note Figs. 4 and 6 of the drawing. These ribs serve to retain the coupling device in proper position and aid in the coupling and uncoupling of the devices 10 and 11 by reason of the proper guiding of said devices into and out of the channels 17 and 18. The curvature and flaring of the coupling device 14 at the enlarged end 16 thereof facilitates the coupling of the attaching devices 10 and 11 as will be apparent.

I also employ in connection with the coupling device 14 a metallic strap member 26, one end of which is secured to one face of the device 14 adjacent the contracted end 15 as seen at 27, and the other end of said strap member is secured to the large end of the device 14 adjacent the opposite side face as seen at 28. The strap member 26 is in spaced relation to the upper face of the device 14 as viewed in the drawing, and the central portion is bent to form an offset or shoulder part 29. Positioned beyond the end of the device 14 is also an inwardly pressed or beaded part 30 adjacent the end wall as clearly seen in Figs. 2 and 3 of the drawing. The strap 26 forms a loop in connection with which a finger piece or operating device 31 is coupled by the passage of the strap through an aperture 32 in one end of the finger piece 31, said end having a flange 33 arranged at right angles to the adjacent part of the finger piece. The aperture 32 extends into said flange, note Fig. 5 of the drawing, thus permitting of the free sliding movement of the finger piece 31 backward and forward in the loop formed by the strap 26 to operate the coupling member 14.

The finger piece 31 is also preferably provided with a short piece of tape 34 to facilitate the grasping of the part 31 and also the manipulation thereof. The finger piece 31, by virtue of the flange 33 provided thereon, also operates as a lock for retaining the coupling member or device 14 in different positions of adjustment. From the foregoing, it will be apparent that when it is desired to lock the device 14 in any desired position, for example, with the attaching devices 10 and 11 fully closed and interlocked or with the same partially interlocked, the finger piece 31 when in the position shown in full lines in Fig. 2 of the drawing, is simply pressed downwardly to bring the flange 33 between the end wall of the device 14 and the corresponding part of the strap 26 or the bead 30 thereof, and the downward movement of said finger piece will move the flange 33 into position between adjacent links 10ª—11ª of the separate attaching devices 10 and 11 as represented in Figs. 3 and 5 of the drawing. When the parts are in this position, as shown in said figures, further movement of the member 14 is prevented and the separation of the attaching devices 10 and 11 by lateral pull or stress is also prevented. To again operate the member 14, all that is necessary to do is to raise the finger piece 31 back into the position shown in full or dotted lines in Fig. 2 of the drawing. The bead 30 serves to frictionally retain the finger piece 31 or flange 33 thereof in operative position or to retain the same in such position under tension.

In Figs. 8 and 9 of the drawing, I have shown modified form of locking means wherein I have substituted for the strap 26 and finger piece 31 and the several parts of these members, a projecting tongue 35 on the enlarged end of the device 14; and pivotally mounted in connection with this tongue, as seen at 36, Fig. 9, is an operating lever 37, the pivoted end of which is forked to span the tongue 35 as shown at 38. The separate members formed by the forked end 38 are provided with laterally directed flanges 39 which are slightly arc-shaped in form. These flanges, when the lever 37 is in position to operate the coupling member 14 to couple and uncouple the attaching devices 10 and 11 or any other means, in dotted line position shown in Fig. 9, are out of engagement with or clear the separate links 10ª—11ª of said attaching devices as seen in Fig. 9 of the drawing. When it is desired to lock the device 14 in a predetermined position of adjustment, the lever 37 is moved into the position shown in full lines. In this operation, the flanges 39 move upwardly between adjacent links 10ª—11ª of the separate attaching devices 10 and 11 adjacent the end wall of the coupling device 14 and lock said coupling device against further movement, in the same manner as the movement of the flange 33 into operative position as seen in Figs. 3 and 5 of the drawing.

In addition to the specific novel structure of the coupling device, it will be apparent that my invention also includes the provision of locking means constituting part of said device and cooperating directly with the members or parts of the attaching device to be coupled together to lock the same against separation or to retain the coupling member against movement. While I have shown certain details of construction for carrying my invention into effect, it will be understood that I am not necessarily limited to these details, and various changes in and modifications of the construction herein shown and described, may be made within the scope of the appended claims without departing from the spirit of my invention or sacrificing its advantages.

Having fully described my invention, what I claim as new and desire to secure by Letters Patent, is:—

1. A coupling device of the class described comprising a substantially V-shaped unitary die-cast body having upper and lower walls, the outer faces of which are flat and terminate in curved edge portions at the sides of the body, channels of substantially circular cross sectional form arranged in said body and opening through the opposite ends thereof, the channels of said body intersecting at the contracted end thereof, a partition wall separating said channels at the flared end of said body, said channels opening outwardly through the opposite sides of the body and said partition wall extending in the direction of the contracted end of the body in independent ribs on the inner face of the upper and lower walls of the body, said ribs terminating inwardly of and adjacent the contracted end thereof.

2. In a flexible closure or fastener, the combination with flexible stringers carrying spaced interlocking fastening devices of substantially circular cross sectional form, of a channeled operating member mounted upon said devices, the channels of said member being of circular cross sectional form, means within the channel of said member engaging crevices formed between the separate fastening devices when coupled together, and a lock device movable longitudinally of said member from one end thereof to the other and adapted to be positioned between adjacent devices on the separate stringers for retaining said member in predetermined position of adjustment.

3. In a flexible closure or fastener, the combination with flexible stringers carrying spaced interlocking fastening devices of substantially circular cross sectional form, of a channeled operating member mounted upon said devices, the channels of said members being of circular cross sectional form, means within the channel of said member engaging crevices formed between the separate fastening devices when coupled together, a lock device movably supported on said member and adapted to be positioned between adjacent devices on the separate stringers for retaining said member in predetermined position of adjustment, and means on said member for frictionally retaining said lock device in operative position.

4. In a flexible closure or fastener, the combination with flexible stringers carrying spaced interlocking fastening devices of substantially circular cross sectional form, of a channeled operating member mounted upon said devices, the channels of said member being of circular cross sectional form, means within the channel of said member engaging crevices formed between the separate fastening devices when coupled together, a lock device movably supported on said member and adapted to be positioned between adjacent devices on the separate stringers for retaining said member in predetermined position of adjustment, means for frictionally retaining said lock device in operative position, and said lock device serving as a finger piece for the manipulation of said member.

5. In an attaching device employing stringers adapted to be coupled and uncoupled, each of said stringers having spaced loop-shaped link members, a slide member mounted upon the link members of the separate stringers and adapted to couple and uncouple the same, said member being channeled to receive said link members, means slidable longitudinally of said member adapted to be moved into the position between the links of the separate stringers for locking said member against movement in either direction on said stringers and for preventing the separation of the stringers when subject to lateral pull or stress, and said means when in inoperative position serving as a finger piece for actuating the slide member on said stringers.

6. In an attaching device employing stringers adapted to be coupled and uncoupled, each of said stringers having spaced loop-shaped link members, a slide member mounted upon the link members of the separate stringers and adapted to couple and uncouple the same, said member being channeled to receive said link members, means on said member adapted to be moved into the position between the links of the separate stringers for locking said member against movement in either direction on said stringers and for preventing the separation of the stringers when subject to lateral pull or stress, said means when in inoperative position serving as a finger piece for actuating the slide member on said stringers, and means for frictionally retaining the first named means in operative position.

7. In an attaching device employing stringers adapted to be coupled and uncoupled, each of said stringers having spaced loop-shaped link members, a slide member mounted upon the link members of the separate stringers and adapted to couple and uncouple the same, said member being channeled to receive said link members, means on said member adapted to be moved into the position between the links of the separate stringers for locking said member against movement in either direction on said stringers and for preventing the separation of the stringers when subject to lateral pull or stress, said means when in inoperative position serving as a finger piece for actuating the slide member on said stringers, means for frictionally retaining the first named means in operative position, and a strap member on said first named means.

8. A coupling device comprising a substantially V-shaped body of unitary construction, channels formed in said body and opening through the opposite ends thereof, the channels of said body intersecting at the contracted end portion thereof, a partition wall separating the channels at the flared end of said body, a strap member extending longitudinally of one side face of said body from the contracted to the flared ends thereof and in spaced relation with reference thereto, a finger piece interlocked with said strap member and capable of movement longitudinally of said body on said strap member, the strap member at the flared end of the body extending transversely to the opposite face thereof to form a channel between it and said body, into which a part on the finger piece is adapted to pass to bring the same in alinement with the adjacent ends of the channels in said body, and means on the last named end portion of said strap member for frictionally retaining the finger piece in said last named channel.

In testimony that I claim the foregoing as my invention I have signed my name this 16th day of Nov., 1925.

DAVIS MARINSKY.